United States Patent
Vogler et al.

(10) Patent No.: US 6,391,274 B1
(45) Date of Patent: May 21, 2002

(54) CARBON BLACK

(75) Inventors: Conny Vogler, Bornheim; Frank Forster, Schollkrippen; Karl Vogel, Alzenau; Burkhard Freund, Erftstadt, all of (DE)

(73) Assignee: Degussa Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/389,465

(22) Filed: Sep. 3, 1999

Related U.S. Application Data
(60) Provisional application No. 60/099,940, filed on Sep. 11, 1998.

(30) Foreign Application Priority Data

Sep. 5, 1998 (DE) .......................................... 198 40 663

(51) Int. Cl.$^7$ ................................................ C09C 1/48
(52) U.S. Cl. ..................... 423/275; 423/449.1; 423/450; 524/495

(58) Field of Search ............................. 423/449.1, 275, 423/450; 524/495

(56) References Cited

FOREIGN PATENT DOCUMENTS

| DE | 195 21 565 A1 | 1/1997 |
|---|---|---|
| DE | 196 13 796 A1 | 10/1997 |

*Primary Examiner*—Stuart L. Hendrickson
(74) *Attorney, Agent, or Firm*—Pillsbury Winthrop LLP

(57) ABSTRACT

Carbon black characterized by a STSA surface of between 20 and 180 m$^2$/g, a 24M4-DBP absorption of between 40 and 140 ml/100 g, a specific BET surface of between 20 and 250 m$^2$/g, a content of 0.01 to 20 wt. % of silicon, referred to its overall weight, and a tan $\delta_0$/tan $\delta_{60}$ ratio greater than 3.37–0.0068 STSA is produced by mixing silicon-containing compounds with the carbon black raw materials in the oxidative pyrolysis of the carbon black raw materials and optionally using carbon black oil as fuel. The carbon black can be used as a filler in rubber mixtures, preferably for tires.

8 Claims, 2 Drawing Sheets

CARBON BLACK

CROSS-REFERENCE TO RELATED APPLICATIONS

This application claims priority to German Application DE 198 40 663.0, filed Sep. 5, 1998, and U.S. provisional application No. 60/099,940 filed Sep. 11, 1998, which disclosures are incorporated herein by reference.

FIELD OF THE INVENTION

The present invention relates to carbon blacks, a process for the production of these carbon blacks, as well as their use, in particular as reinforcing carbon blacks in rubber mixtures.

BACKGROUND OF THE INVENTION

Carbon blacks are known from Ullmanns Enzyklopädie der technischen Chemie, 4th Edition (1977), Vol. 14, pp. 633 to 648.

The most important processes for producing carbon blacks are based on the oxidative pyrolysis of carbon-containing carbon black raw materials. In these processes the carbon black raw materials are incompletely burnt at high temperatures in the presence of oxygen. These carbon black production processes include for example the furnace carbon black process, the gas carbon black process and the flame carbon black process. Predominantly polynuclear aromatic carbon black oils are used as carbon black raw materials.

Carbon blacks are used as fillers and as reinforcing agents in the preparation of rubber mixtures for the tire industry. In addition to natural and/or synthetic rubber, typical rubber mixtures also include carbon black, mineral oil and further additives as well as sulfur as vulcanization agent.

Carbon blacks influence the abrasion resistance, rolling resistance as well as the wet skidding behavior of tires produced from these rubber mixtures. For rubber mixtures that serve as tire treads, tread mixtures having a high abrasion resistance and, at the same time, as low a rolling resistance as possible combined with good wet skidding behavior are required. A low rolling resistance leads to low fuel consumption of the vehicle.

Rolling resistance and wet skidding properties are influenced by the viscoelastic behavior of the tread mixture. With periodic deformation the viscoelastic behavior can be described by the mechanical loss factor tan $\delta$ and, in the case of stretching or compression, by the dynamic modulus of elasticity $|E^*|$. Both quantities are strongly temperature-dependent.

The wet skidding behavior of the tread mixture is correlated with the loss factor tan $\delta_0$ at 0° C., while the rolling resistance is correlated with the loss factor tan $\delta_{60}$ at 60° C. The higher the loss factor at the low temperature, the better usually is the wet skidding behavior of the tire mixture. In order to reduce the rolling resistance, as small a loss factor as possible at the high temperature is required.

The abrasion resistance and the viscoelastic properties, and thus also the loss factor of the tread mixtures, are essentially determined by the properties of the reinforcing carbon blacks that are used.

An important index for the rubber-active surface proportion of the carbon black is the specific surface, in particular the CTAB surface or STSA surface. With increasing CTAB surface or STSA surface both the abrasion resistance and tan $\delta$ increase.

Further important carbon black parameters are the DBP absorption as a quantitative measure of the initial structure, and the 24M4-DBP absorption as a measure of the residual structure still remaining after the carbon black has been subjected to mechanical stress.

For tread mixtures, carbon blacks are suitable that have CTAB surfaces between 80 and 180 $m^2/g$ and 24M4-DBP absorption values between 80 and 140 ml/100 g.

It is known that ASTM carbon blacks are unable to influence the temperature dependence of the loss factor tan $\delta$ in such a way that the tread mixture has a lower rolling resistance with the same or better wet skidding behavior. As is known, the desired reduction of the rolling resistance is directly coupled to a deterioration of the wet skidding behavior. Carbon blacks that have a low rolling resistance are termed so-called "low hysteresis" carbon blacks.

It is furthermore known that the rolling resistance of tires can be reduced by replacing the carbon black by silica (see EP 0 447 066 A1). In order to bind the silica to the polymer building blocks of the rubber, silane coupling reactants are used. Silica-containing rubber mixtures have a loss factor tan $\delta_{60}$ that is reduced by up to 50%.

SUMMARY OF THE INVENTION

The object of the present invention is to provide carbon blacks that impart to rubber mixtures of natural rubber or synthetic rubber or mixtures thereof a reduced rolling resistance with at the same time the same or an improved wet skidding behavior and abrasion resistance.

The present invention provides a carbon black that has a STSA surface of between 20 and 180 $m^2/g$, a 24M4-DBP absorption of between 40 and 140 ml/100 g, a specific BET surface of between 20 and 250 $m^2/g$ and a content of 0.01 to 20 wt. % of silicon, referred to its overall weight, which is characterized in that in rubber mixtures it has a tan $\delta_0$/tan $\delta_{60}$ ratio of greater than 3.37–0.0068 STSA.

In an embodiment of the invention the carbon black may contain, in addition to silicon, 0.01 to 1 wt. % of nitrogen.

The silicon is incorporated into the carbon black aggregates during the production process. For this purpose silicon-containing compounds may, for example, be mixed into the carbon black raw material. Suitable silicon-containing compounds may be organosilicon compounds such as organosilanes, organochlorosilanes, siloxanes and silazanes. In particular silicone oils, silicon tetrachloride, siloxanes and silazanes may be used. Silanes and silicone oils may preferably be used.

The starting compound has only a slight influence on the incorporation of the silicon atoms into the carbon black aggregates. It can be shown by X-ray photoelectron spectrometry (XPS) and secondary ion mass spectrometry (SIMS) that the silicon atoms are oxidically bound and distributed in the carbon black aggregates. The oxidic bonding consists predominantly of silicon dioxide. Other silicon atoms form silanol groups. Whereas the silanol groups are mainly located on the surface of the carbon black aggregates, silicon dioxide is distributed uniformly over the cross-section of the aggregates.

In one embodiment of the invention the silicon may be concentrated in the sub-surface regions of the carbon black aggregates.

After incorporation into rubber mixtures, the silicon-containing groups on the surface of the carbon black aggregates influence the interaction of the filler with the rubber polymer components. To effect a covalent bonding of the silanol groups of the carbon blacks to the polymer mixture bifunctional silanes, for example Si69 (Bis(3-triethoxysilylpropyl)-tetrasulfane) from Degussa-Hüls A G, Germany, may be added to the rubber mixtures as a silane coupling reagent.

The tread mixtures produced with the silicon-containing carbon blacks according to the invention exhibit an increased value of tan $\delta_0$ and a reduced value of tan $\delta_{60}$ compared to known carbon blacks having the same specific surface and structure, without the need to add a coupling reagent. These values correspond to a substantially improved wet skidding behavior combined with a substantially reduced rolling resistance of the tread. The rolling resistance of the rubber mixtures can be improved still more, i.e. reduced further, by adding bifunctional silanes.

The carbon blacks according to the invention may be produced by the furnace carbon black process according to DE 195 21 565 A1.

According to the furnace carbon black process the oxidative pyrolysis of the carbon black raw material is carried out in a reactor lined with highly refractory material. In such a reactor three zones, disposed one following the other along the reactor axis and through which the reaction media flow in succession, may be distinguished.

The first zone, the so-called combustion zone, essentially comprises the combustion chamber of the reactor. A hot process gas is produced in this zone by burning a fuel, generally hydrocarbons, with an excess of preheated combustion air or other oxygen-containing gases. Natural gas may be used as fuel. Liquid hydrocarbons such as light and heavy heating oil may also be used.

In a preferred embodiment of the invention carbon black raw material (carbon black oil) may also be used as fuel.

The combustion of the fuel normally takes place with an excess of oxygen. The excess air promotes the complete conversion of the fuel and serves to control the quality of the carbon black. The fuel is normally introduced into the combustion chamber by means of one or more burner lances.

The formation of the carbon black takes place in the second zone of the carbon black reactor, the so-called reaction zone or pyrolysis zone. To this end the carbon black raw material, generally a carbon black oil, is injected into and mixed with the stream of hot process gas. The amount of hydrocarbons introduced into the reaction zone is in excess referred to the incompletely reacted amount of oxygen in the combustion zone. For this reason the formation of carbon black normally takes place here.

If the carbon black oil is also used as fuel, the formation of carbon black may start to take place in the combustion zone. In the reaction zone further carbon black may then be added to the carbon black particles formed in the combustion zone.

Carbon black oil may be injected in various ways into the reactor. For example, an axial oil injection lance or one or more radial oil lances, arranged on the circumference of the reactor in a plane perpendicular to the flow direction, are suitable. A reactor may contain several planes with radial oil lances along the flow direction. Spray or injection nozzles are arranged on the head of the oil lances, by means of which the carbon black is mixed into the flow of process gas. With the simultaneous use of carbon black oil and gaseous hydrocarbons, for example methane, as carbon black raw material, the gaseous hydrocarbons may be injected separately from the carbon black oil via their own set of gas lances into the flow of the hot waste gas.

In the third zone of the carbon black reactor, the so-called termination zone or quench zone, the carbon black formation is terminated by rapid cooling of the carbon black-containing process gas. In this way undesired after-reactions are avoided. The reaction is normally terminated by spraying in water through suitable spray nozzles. The carbon black reactor generally includes several places along the reactor for spraying in water, i.e. "quenching", so that the residence time of the carbon black in the reaction zone may be varied. In a heat exchanger connected downstream, the residual heat of the pressure gas is utilized to preheat the combustion air and the carbon black oil.

Whereas the object of the known furnace carbon black processes is to achieve as complete a combustion as possible of the fuel in the combustion chamber, or in the combustion zone, the process according to the invention for producing carbon black is based on the fact that carbon seeds are formed in the combustion zone as a result of the incomplete combustion of the fuel, which seeds are transported with the flow of hot waste gas into the reaction zone, where they initiate a seed-induced carbon black formation with the added carbon black raw material. The sought-after incomplete combustion of the fuel does not mean however that the fuel is burnt in a deficit of oxygen. Rather, the process according to the invention employs an excess of air or oxygen-containing gases in the combustion chamber. K factors of between 0.3 and 1.2 may be employed as with conventional carbon blacks. The process is preferably operated with K factors of between 0.6 and 0.7.

Various methods may be adopted in order to produce carbon black seeds despite the excess air. In a preferred variant of the process according to the invention liquid hydrocarbons are used as fuel, which are burnt instead of natural gas in the combustion chamber of the reactor with an excess of air or oxygen-containing gases. Liquid hydrocarbons burn more slowly than gaseous hydrocarbons since they first have to be converted into the gaseous form, i.e. have to be evaporated. Despite the excess oxygen, in addition to the combustion, carbon seeds may also be produced with liquid hydrocarbons which, if sufficient time is available and the temperature is sufficiently high, also continue to burn or, if rapid cooling is effected, can grow into larger carbon black particles. The seed-induced carbon black formation is based on the fact that the seeds formed in the combustion of liquid hydrocarbons with excess oxygen are brought into contact directly with the carbon black oil and thus initiate the seed growth.

Another variant of the process according to the invention uses natural gas as fuel. Seed formation is achieved if the outflow speed of the gas from the burner lance or lances is chosen sufficiently low so as intentionally to achieve a poor intermixing of the natural gas with the hot flow of the combustion air. The formation of carbon black seeds with poorly mixed flames is known, in which connection on account of the glow of the formed particles one also speaks of glowing flames. With this procedure it is likewise important, as with the combustion of liquid hydrocarbons, to bring the resultant seeds immediately after their formation into contact with the carbon black oil. If an attempt is made by means of a larger combustion chamber or combustion zone to react the seeds with the oxygen present in excess in the combustion zone so as to achieve a complete combustion in the combustion zone of the carbon black reactor, then no seed-induced formation of carbon black takes place.

The carbon blacks according to the invention may be produced by mixing the aforedescribed silicon-containing compounds into the carbon black raw materials or spraying them separately into the combustion chamber or the pyrolysis zone of the carbon black reactor. The mixing of the silicon-containing compounds into the carbon black oil may be effected in the form of a solution if the compounds are soluble in the carbon black oil, or in the form of an emulsion. Incorporation of the silicon atoms into the carbon black primary particles is achieved by means of these measures. One or more of the oil lances normally employed for spraying in the carbon black raw material may be used for the separate spraying of the silicon-containing compounds into the pyrolysis zone of the carbon black reactor.

The furnace carbon black process is modified for the production of inversion carbon black. Whereas the object of the conventional furnace carbon black processes is to achieve as complete a combustion as possible of the fuel in the combustion chamber or in the combustion zone, the process according to DE 195 21 565 for producing inversion carbon blacks is based on the fact that carbon seeds are formed by incomplete combustion of the fuel in the combustion zone, which seeds are transported with the flow of hot waste gas into the reaction zone and there initiate a seed-induced formation of carbon black with the added carbon black raw material. The sought-after incomplete combustion of the fuel does not mean however that the fuel is burnt in a deficit of oxygen. Rather, the process according to the invention operates with an excess of air or oxygen-containing gases in the combustion chamber. K factors of between 0.3 and 0.9 may be employed as with conventional carbon black.

In order to produce carbon black seeds despite the excess air, various measures may be adopted according to DE 195 21 565. In a preferred variant of the process, liquid hydrocarbons are used as fuel, which are burnt with an excess of air or oxygen-containing gases instead of natural gas in the combustion chamber of the reactor. Liquid hydrocarbons burn more slowly than gaseous hydrocarbons since they first have to be converted into the gaseous form, i.e. have to be evaporated. Despite the excess oxygen, in addition to the combustion, carbon seeds may thus also be produced with liquid hydrocarbons which, if there is sufficient time and the temperature is sufficiently high, will also continue to burn, or if rapid cooling is effected can grow to form larger carbon black particles. The seed-induced formation of carbon black is based on the fact that the seeds formed in the combustion of liquid hydrocarbons with excess oxygen are brought into contact directly with the carbon black oil and thus initiate the seed growth.

Another variant of the process according to DE 195 21 565 uses natural gas as fuel. Seed formation is achieved if the outflow speed of the gas from the burner lance or lances is chosen sufficiently low so as intentionally to achieve a poor intermixing of the natural gas with the hot flow of the combustion air. The formation of carbon black seeds with poorly mixed flames is known, in which connection on account of the glow of the formed particles one also speaks of glowing flames. With this procedure it is likewise important, as with the combustion of liquid hydrocarbons, to bring the resultant seeds immediately after their formation into contact with the carbon black oil. If an attempt is made by means of a larger combustion chamber or combustion zone to react the seeds with the oxygen present in excess in the combustion zone so as to achieve a complete combustion in the combustion zone of the carbon black reactor, then no seed-induced formation of carbon black takes place.

The two aforedescribed variants may also be combined with one another. In this case the liquid hydrocarbons and natural gas or other gaseous fuels are added simultaneously in suitable ratios to the combustion zone. Oils, for example the carbon black oil itself, are preferably used as liquid hydrocarbons.

The process according to DE 195 21 565 thus comprises using in the combustion zone, in which the oxygen is present in excess, referred to the hydrocarbons that are used, liquid and/or gaseous hydrocarbons as fuel and thereby ensuring that carbon black seeds are formed for example by an insufficient residence time of the liquid hydrocarbons or by an insufficient intermixing of the gaseous hydrocarbons with the combustion air, which carbon seeds immediately after their formation are brought into contact in the reaction zone with the carbon black material, which is used in excess referred to the amount of oxygen, the resultant carbon black/reaction gas mixture is cooled by spraying water into the termination zone, and the carbon black that is thus formed is worked up in the conventional way.

According to DE 195 21 565 the fuel contributes decisively to the carbon black formation and is therefore hereinafter termed primary carbon black raw material. The carbon black raw material that is to be mixed into the reaction zone is accordingly termed secondary carbon black raw material and contributes most quantitatively to the carbon black that is formed.

The inversion carbon blacks according to DE 195 21 565 impart to carbon black mixtures a reduced rolling resistance and a comparable wet adhesion compared to corresponding conventional carbon blacks. Furthermore, it has been found by Atomic Force Microscopy (AFM) investigations that the inversion carbon blacks have a significantly rougher surface than corresponding standard ASTM carbon blacks and thereby enable improved binding of the rubber polymer to the carbon black particles (see W Gronski et al. "NMR Relaxation—A Method Relevant for Technical Properties of Carbon Black Filled Rubbers; International Rubber Conference 1997, Nurenberg, Germany, p. 107). The improved bonding of the rubber polymer leads to the reduced rolling resistance.

Investigations of abrasion of rubber mixtures using inversion carbon blacks have shown that these carbon blacks impart an improved abrasion resistance to the rubber mixtures at low loads. At high loads, such as occur in the case of truck tires, these rubber mixtures exhibit an increased abrasion (reduced abrasion resistance).

In one embodiment of the invention improved inversion carbon blacks can be used that are characterized in particular by reduced abrasion (improved abrasion resistance) at high loads.

Thus it is possible to use a furnace carbon black having CTAB values of between 20 and 190 $m^2/g$ and 24M4-DBP absorption of between 40 and 140 ml/100 g with a tan $\delta_0$/tan $\delta_{60}$ ratio which, on incorporation into a SSBR/BR rubber mixture, satisfies the relationship $$\tan \delta_0/\tan \delta_{60} > 2.76 - 6.7 \times 10^{-3} \times CTAB$$

wherein the value of tan $\delta_{60}$ is always lower than the value for ASTM carbon black having the same CTAB surface and 24M4-DBP absorption. This carbon black is accordingly characterized by the fact that the distribution curve of the particle diameters of the carbon black aggregates have an absolute skewness of less than 400,000 $nm^3$.

These carbon blacks that can be used according to the invention satisfy the same requirements as regards the tan $\delta_0$/tan $\delta_{60}$ ratio as the known inversion carbon blacks, and accordingly when incorporated into rubber mixtures impart a reduced rolling resistance to the tires produced therefrom. However, they are characterized by a narrower aggregate size distribution compared to the known inversion carbon blacks. The mathematical quantity "absolute skewness" known from statistics is used to describe the aggregate size distribution (see: Lothar Sachs: "Statistische Auswertungsmethoden", (Statistical Evaluation Methods), Springer-Verlag Berlin, 3rd Edition, pp. 81 to 83). This quantity provides a description of the shape of the aggregate size distribution curve that can be applied to the present problem in the form of a restriction on the aggregate sizes by means of maximum and minimum values.

The term "absolute skewness" is understood to be the deviation from a symmetrical aggregate size distribution. A skew distribution curve exists when one of the two descending branches of the distribution curve is extended. If the left-hand part of the curve is extended, one speaks of negative skewness, i.e. the determination of the absolute skewness provides values less than zero. If the right-hand section of the curve is extended, a positive skewness exists with values greater than zero. The known ASTM carbon blacks as well as the inversion carbon blacks and the carbon blacks according to the invention all have a positive skewness of differing magnitudes.

It has surprisingly been found that the accepted opinion in the prior art that a broader aggregate size distribution of the reinforcing carbon black imparts. a reduced rolling resistance to the rubber mixtures does not have any general validity. The improvement in the rolling resistance of rubber mixtures that is observed with inversion carbon blacks is obviously not dependent on the width of the aggregate size distribution, but is essentially due to the greater surface roughness of the inversion carbon blacks and the associated better bonding of the rubber polymer to the carbon black surface.

With regard to the known inversion carbon blacks with their relatively broad aggregate size distribution, their abrasion resistance can now be improved according to the invention by restricting the width of the aggregate distribution. In particular, the proportion of carbon black aggregates with large particle diameters must be reduced if the carbon blacks are to impart to the rubber mixtures an improved abrasion resistance combined at the same time with a reduced rolling resistance. This is the case if the absolute skewness of the aggregate size distribution is less than 400,000, preferably less than 200,000 nm$^3$. The absolute skewness of the inversion carbon blacks known from DE 195 21 565 is above 400,000 nm$^3$, whereas the absolute skewness of standard ASTM carbon blacks is below 100,000 nm$^3$.

The absolute skewness of the aggregate size distribution of a carbon black can be determined by means of a disc centrifuge and corresponding evaluation of the measurement values. The carbon black sample to be investigated is dispersed in an aqueous solution and separated in a disc centrifuge according to its particle size: the larger the particles, the greater their mass and the more rapidly the carbon black particles move outwardly in the aqueous solution as a result of the centrifugal force. The particles traverse a light barrier by means of which the extinction is recorded as a function of time. The aggregate size distribution, in other words the frequency as a function of the particle diameter, is calculated from these data. The absolute skewness AS can be determined from this distribution as follows:

$$AS = \frac{\sum_{i=1}^{k} H_i (x_i - \bar{x})^3}{\sum_{i=1}^{k} H_i}$$

In the above expression $H_i$ denotes the frequency with which the particle size diameter $x_i$ occurs. $\bar{x}$ is the particle size diameter of the particles whose mass corresponds to the mean particle mass of the carbon black aggregates. $\bar{x}$ is also calculated with the aid of the aggregate size distribution. The summations in the above formula must be performed in the range from 1 nm to 3,000 nm at equidistant intervals of in each case one nanometer. Any intermediate measurement values are calculated by linear interpolation.

The inversion carbon blacks according to the invention can be produced by the generic process described in DE 195 21 565. According to this process the inversion carbon black is produced in a carbon black reactor that contains along the reactor axis a combustion zone, a reaction zone and a termination zone. In the combustion zone a stream of hot waste gases is produced by combustion of a primary carbon black raw material in oxygen-containing gases. This hot gas stream is passed from the combustion zone through the reaction zone to the termination zone. In the reaction zone a secondary carbon black raw material is mixed in with the hot waste gas. The formation of carbon black is stopped in the termination zone by spraying in water. In the above process oil, an oil/natural gas mixture or natural gas alone is used as the primary carbon black raw material. The combustion of the primary carbon black raw material in the combustion zone is carried out in such a way that carbon black seeds are formed, with which the secondary carbon black raw material is brought into direct contact.

In order to obtain the carbon blacks according to the invention this process must be carried out in such a way that the carbon black that is formed has an aggregate size distribution with an absolute skewness of less than 400,000 nm$^3$. This can be achieved for example by increasing the addition of combustion air, or primary and secondary carbon black raw material.

The described process is not restricted to a specific reactor geometry. Indeed, it can be adapted to various types and sizes of reactors. The person skilled in the art can effect the desired seed formation in the combustion zone by various measures. Possible influencing factors for optimizing the seed formation when using oil as fuel are the combustion air/oil weight ratio, the type of fuel atomizer that is used, and the size of the atomized oil droplets. Pure pressure atomizers (single-substance atomizers) as well as two-substance atomizers with internal or external mixing can be used as fuel atomizers, in which connection compressed air, steam, hydrogen, an inert gas or also a hydrocarbon gas can be used as the atomizing medium. The aforedescribed combination of a liquid and a gaseous fuel can thus be realized for example by using the gaseous fuel as the atomizing medium for the liquid fuel.

BRIEF DESCRIPTION OF THE DRAWING

The invention is illustrated in more detail with the aid of the drawings, in which.

DETAILED DESCRIPTION OF THE PREFERRED EMBODIMENTS

EXAMPLES

Figure 1:
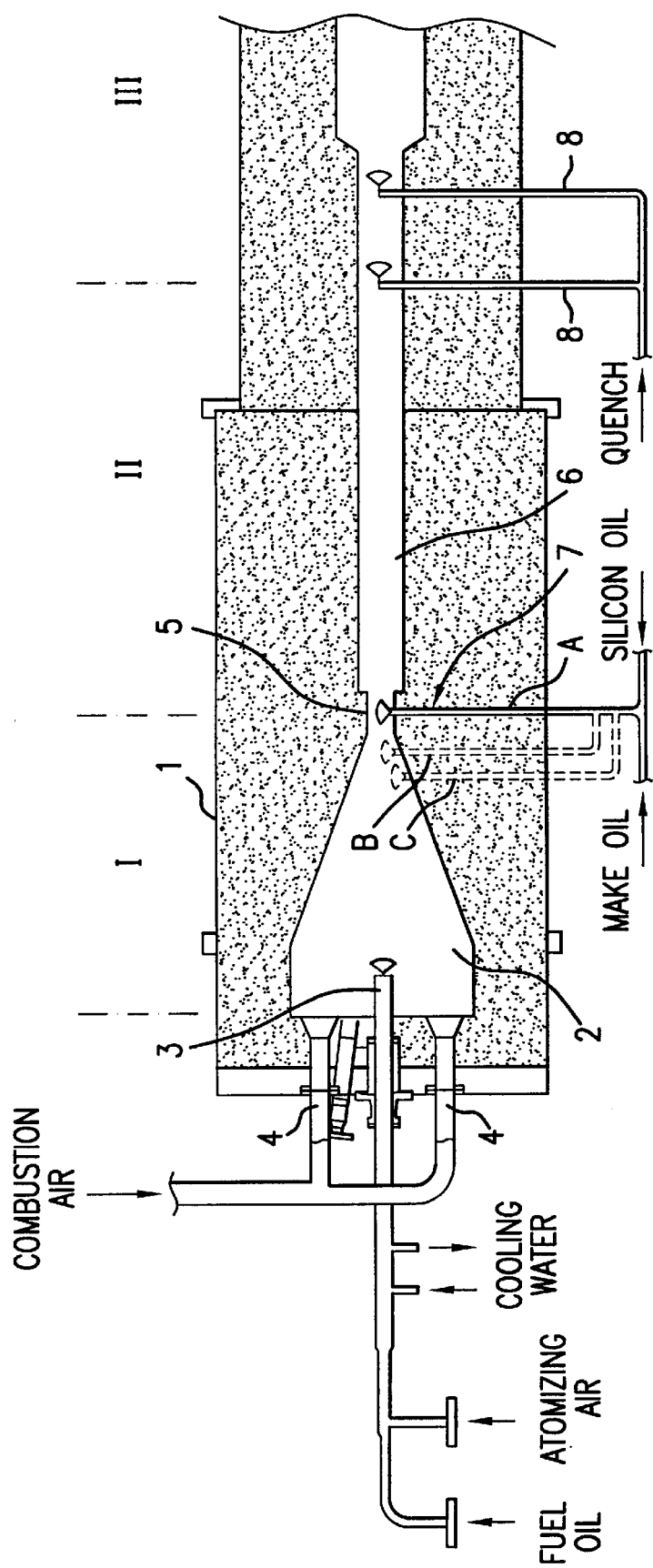
FIG. 1 is a longitudinal section through a reactor used to produce carbon blacks according to the invention.

A carbon black according to the invention is produced in the carbon black reactor 1 illustrated in FIG. 1. This carbon black reactor 1 has a combustion chamber 2 in which the hot waste gas for the pyrolysis of the carbon black oil is generated by burning oil under the addition of an excess of atmospheric oxygen. The fuel is added to the combustion chamber through the axial burner lance 3. The burner lance can be displaced axially in order to optimize the seed-induced formation of carbon black.

The combustion air is added through the opening 4 in the front wall of the combustion chamber. The combustion chamber tapers conically to the constriction 5. After passing through the constriction the reaction gas expands into the reaction chamber 6.

Various positions for the injection of the carbon black oil into the hot process gas by means of the oil lances 7 are denoted by A, B and C. The oil lances are provided at their heads with suitable spray nozzles. At each injection position four injectors are distributed over the circumference of the reactor.

The combustion zone, reaction zone and termination zone, which are important for the process according to the invention, are denoted in FIG. 1 by the Roman numerals I to III. They cannot be sharply differentiated from one another. Their axial length depends on the relative positions of the burner lance, oil lances and quenching water lance 8.

The dimensions of a reactor that can be used are as follows:

| | |
|---|---|
| Largest diameter of the combustion chamber: | 530 mm |
| Length of the combustion chamber to the constriction: | 1525 mm |
| Length of the conical part of the combustion chamber: | 1160 mm |
| Diameter of the constriction: | 140 mm |
| Length of the constriction: | 230 mm |
| Diameter of the reaction chamber: | 240 mm |
| Position of the oil lances[1] | A: +110 mm |
| | B: −150 mm |
| | C: −410 mm |
| Position of the quench water lance(s)[1] | 1: 1355 mm |
| | 2: 2900 mm |

[1]Measured from the entry to the constriction (+: after entry −: before entry)

All carbon blacks produced in the described reactor are formed into beads according to known processes before their characterization and incorporation into the rubber mixtures. Natural gas and a carbon black oil with a carbon content of 91.4 wt. % and a hydrogen content of 6.1 wt. % are used as fuel for producing the carbon blacks according to the invention.

The reactor parameters for the production of the carbon blacks according to the invention are listed in Table 1. Carbon blacks R1, R2 and R3 as well as the comparative carbon black A4496 are produced. For the production, silicone oil as the silicon-containing compound is admixed with the carbon black oil.

For the carbon blacks R1 to R3 according to the invention the relevant quantities are metered so that the finished carbon black contains 5.6 wt. % of silicon.

TABLE 1

Reactor parameters for the production of the carbon blacks

| | | Carbon black | | |
|---|---|---|---|---|
| Parameter | Unit | A 4496 | R1, R3 | R2 |
| Combustion air | Nm³/h | 3000 | 2700 | 2700 |
| Temperature of the combustion air | °C. | 560 | 450 | 450 |
| Fuel (natural gas) | Nm³/h | 237 | — | — |
| Fuel oil | Kg/h | — | 200 | 200 |
| Carbon black oil | Kg/h | 640 | 360 | 365 |
| Temperature of carbon black oil | °C. | 131 | 127 | 127 |
| Silicone oil | l/h | — | 36 | 36 |
| Position of the carbon black oil injectors | | 4 × A | 4 × A | 4 × A |
| Additive concentration | g/l | 1 | 1 | 1 |

TABLE 1-continued

Reactor parameters for the production of the carbon blacks

| | | Carbon black | | |
|---|---|---|---|---|
| Parameter | Unit | A 4496 | R1, R3 | R2 |
| Amount | l/h | 2 | 14 | 11.5 |
| Quench position[1] | mm | 1355 | 1355 | 1355 |

[1]Measured from the entry to the constriction
The carbon blacks R1, R2 and A 4496 are wet beaded.
The carbon black R3 is dry beaded The analytical data of the produced carbon blacks are determined according to the following standard methods and are listed in Table 2:
   STSA surface: ASTM D-5816
   DBP absorption: ASTM D-2414
   24M4-DBP Absorption: ASTM D-3493

TABLE 2

Carbon black analytical data

| Carbon black | DBP [ml/100 g] | 24M4-DBP [ml/100 g] | Si [wt. %] | STSA [m²g] | CTAB [m²/g] |
|---|---|---|---|---|---|
| N220 | 114 | 98 | 0 | 107 | 110 |
| A4496 | 112 | 96 | 0 | 108 | 110 |
| R1 | 103 | 94 | 5.6 | 110 | 121 |
| R2 | 102 | 96 | 5.6 | 112 | 122 |
| R3 | 118 | 91 | 5.6 | 103 | 113 |

APPLICATION EXAMPLE

The carbon blacks R1, R2 and R3 as well as the comparative carbon blacks N220 and A4496 are used to produce rubber mixtures. Among other properties, the viscoelastic properties of the rubber mixtures are determined.

The viscoelastic properties of the rubber mixtures reinforced with these carbon blacks are determined according to DIN 53513. The loss factors tan δ at 0° C. and at 60° C. are in particular determined. The test formulation used for the rubber mixtures is shown in Table 3.

TABLE 3

SSBR/BR test formulation

| Mixture components | Contents [phr] |
|---|---|
| SSBR | 96.0 |
| BR | 30.0 |
| Carbon black | 80.0 |
| ZnO RS | 3.0 |
| Stearic acid | 2.0 |
| Aromatic oil | 10.0 |
| 6 PPD | 1.5 |
| Wax | 1.0 |
| CBS | 1.5 |
| DPG | 2.0 |
| TMTD | 0.2 |
| Sulfur | 1.5 |
| Silane coupling reagent Si69 | Arbitrary |

The SSBR rubber component is a SBR copolymer polymerized in solution, with a styrene content of 25 wt. % and a butadiene content of 75 wt. %. The vinyl content of the butadiene is 67%. The copolymer contains 37.5 phr oil and is marketed under the trade name Buna VSL 5025-1 by Bayer AG. This copolymer has a Mooney viscosity (ML 1+4/100° C.) of about 50.

The BR rubber component is a cis 1,4-polybutadiene (Neodym type) with a cis 1,4-content of at least 96 wt. %, a trans 1,4-content of 2 wt. %, a 1,2-content of 1 wt. %, and a Mooney viscosity of 44±5. This component is marketed under the trade name Buna CB 24 by Bayer AG.

Naftolen ZD from Chemetall is used as the aromatic oil. The PPD component of the test formulation is Vulkanox 4020 and the CBS component is Vulkacit CZ, DPG is Vulkacit D and TMTD is Vulkacit Thiuram, all from Bayer AG. Protector G35 from HB-Fuller GmbH is used as wax.

The carbon black s are incorporated into the rubber mixture in three stages corresponding to the following tabular description:

| Stage 1 | |
|---|---|
| Settings | |
| Mixing unit | Werner & Pfleiderer GK 1.5 N |
| Friction | 1:1.11 |
| Rotational speed | 70 min$^{-1}$ |
| Plunger pressure | 5.5 bar |
| Empty volume | 1.6 l |
| Degree of filling | 0.73 |
| Throughflow temperature | 80° C. |
| Mixing procedure | |
| 0 to 1 min | Buna VSL 5025-1 + Buna CB 24 |
| 1 to 3 min | Half carbon black + ZnO RS + stearic acid + Naftolen ZD + optionally Si69 |
| 3 to 4 min | Half carbon black, Vulkanox 4020 + Protector G35 |
| 4 min | Clean |
| 4 to 6 min | Mix and discharge |
| Batch temperature | 150–160° C. |
| Storage | 24 hours at room temperature |

| Stage 2 | |
|---|---|
| Settings | |
| Mixing unit | As in stage 1, up to |
| Degree of filling | 0.71 |
| Flowthrough temperature | 90° C. |
| Mixing procedure | |
| 0 to 2 min | Break up batch from stage 1 |
| 2 to 5 min | Hold batch temperature of 160° C. by varying rotational speed |
| 5 min | Discharge |
| Batch temperature | 160° C. |
| Storage | 4 h/RT |

| Stage 3 | |
|---|---|
| Settings | |
| Mixing unit | as in stage 1, up to |
| Degree of filling | 0.69 |
| Throughflow temperature | 50° C. |
| Rotational speed | 40 |
| Mixing procedure | |
| 0 to 2 min | Batch from stage 2 + Vulkacit CZ + Vulkacit D and Vulkacit Thiuram + Sulfur |
| 2 min | Discharge and form rolled sheets in a laboratory mixer (diameter 200 mm, length 450 mm, throughflow temperature 50° C.) |
| | For homogenization: |
| | Cut 3 times LH and 3 times RH and fold, also |
| | break up 8 times with narrow roller gap (1 mm) and 3 times with broad roller gap (3.5 mm) and then remove rolled sheet |

The subsequent determination of the rubber properties, i.e. Shore hardness, tensile stress values M100 and M300, rebound at 0° and 60° C. as well as loss factor tan δ at 0° and 60° C. and the dynamic modulus of elasticity |E*| at 0° C., are all measured according to the specified standard methods. The measurement conditions for the viscoelastic properties are summarized in Table 4.

TABLE 4

Determination of the viscoelastic properties according to DIN 53513

| Vulcanization of the test bodies | |
|---|---|
| Vulcanization temperature | 165° C. |
| Vulcanization duration | T$_{95}$ + 5 min (T$_{95}$: DIN 53529) |
| Test body shape | |
| Shape | Cylindrical |
| Length | 10 mm |
| Diameter | 10 mm |
| Number | 5 |
| Testing machine | |
| Type/Manufacturer | 830/MTS |
| Type of stress | Elongation |
| Mean force amplitude | 50 N |
| Dynamic force amplitude | ±25 N |
| Test frequency | 16 Hz |
| Test sequence | Temper for 5 minutes then dynamic loading at 16 Hz for 2 minutes followed by measurement |

In each case the median value of the measurements on the five test bodies is used.

The results of the rubber tests are listed in Table 5. Compared to the comparative carbon black, the carbon blacks according to the invention impart to the rubber mixtures a reduced loss factor at 60° C. and an increased loss factor at 0° C. without a coupling agent. The loss factor at 60° C. can be reduced further by adding Si69. Tires that are produced from such rubber mixtures may therefore be expected to have an improved wet skidding behavior with, at the same time, a reduced rolling resistance.

The dry beaded carbon black R3 leads to a further drop in tan δ at 60° C. compared to the wet beaded carbon black R1.

Figure 2:
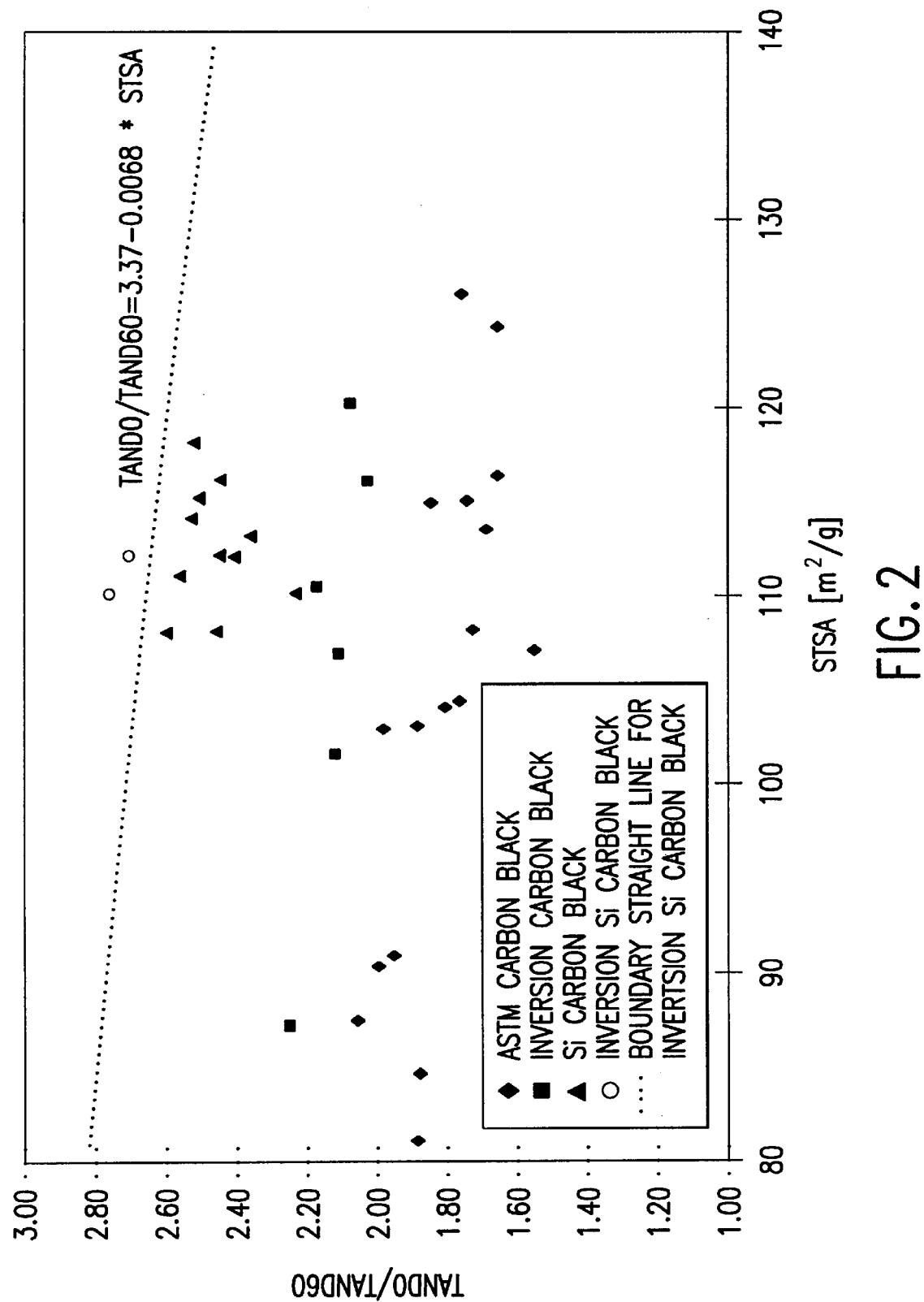
FIG. 2 shows, graphically, a comparison of tan $\delta_0/\delta_{60}$ against STSA surface for inventive and comparative carbon blacks.

The advantageous behavior of the carbon blacks according to the invention is shown graphically in FIG. 2.

In FIG. 2 the tan δ$_0$/tan δ$_{60}$ ratio is plotted against the STSA surface for these carbon blacks. The two carbon blacks according to the invention have a significantly larger tan δ ratio for the same STSA surface, i.e. a steeper temperature profile of the loss factors.

The region of the carbon blacks according to the invention can be clearly demarcated from that of the conventional carbon blacks. It lies above the boundary straight line shown in FIG. 2, which is given by the calculation $$\tan \delta_0/\tan \delta_{60} = 3.37 - 0.0068 \text{ STSA}.$$

TABLE 5

Results of the rubber investigation

| Filler | Si69 [phr] | Shore A DIN 53505 | M100 DIN 53504 [MPa] | M300 DIN 53504 [MPa] | Rebound °C ASTM D 5308 [%] | Rebound 60° C. ASTM D 5308 [%] | tan $\delta_0$ DIN 53513 | tan $\delta_{60}$ DIN 53513 | E* 0° C. DIN 53513 [MPa] | tan $\delta_0$/tan $\delta_{60}$ |
|---|---|---|---|---|---|---|---|---|---|---|
| N220  | 0   | 68 | 2.1 | 10.1 | 14.7 | 35.4 | 0.427 | 0.279 | 55.9 | 1.53 |
| A4496 | 0   | 68 | 2.0 | 10.4 | 14.6 | 36.4 | 0.447 | 0.261 | 46.8 | 1.71 |
| R1    | 0   | 62 | 1.9 | 9.2  | 14.1 | 48.6 | 0.480 | 0.176 | 22.2 | 2.73 |
| R2    | 0   | 64 | 1.9 | 9.2  | 14.7 | 47.3 | 0.478 | 0.179 | 22.7 | 2.67 |
| R3    | 0   | 61 | 1.8 | 9.7  | 14.0 | 50.7 | 0.467 | 0.166 | 19.4 | 2.81 |
| N220  | 2.4 | 69 | 2.6 | 12.4 | 15.0 | 41.2 | 0.482 | 0.239 | 39.4 | 2.02 |
| A4496 | 2.4 | 67 | 2.5 | 12.6 | 14.7 | 42.2 | 0.479 | 0.229 | 34.9 | 2.09 |
| R1    | 2.4 | 65 | 2.5 | 13.1 | 14.3 | 55.1 | 0.431 | 0.151 | 18.7 | 2.85 |
| R2    | 2.4 | 65 | 2.4 | 12.8 | 14.0 | 53.1 | 0.440 | 0.159 | 19.9 | 2.77 |
| R3    | 2.4 | 63 | 2.5 | 14.0 | 14.3 | 58.7 | 0.412 | 0.139 | 16.9 | 2.96 |
| R1    | 4.8 | 65 | 2.9 | —    | 14.5 | 56.9 | 0.411 | 0.141 | 19.0 | 2.91 |
| R2    | 4.8 | 66 | 3.0 | —    | 14.4 | 57.6 | 0.399 | 0.140 | 19.2 | 2.85 |

What is claimed is:

1. A carbon black with a STSA surface of between 20 and 180 m²/g, a 24M4-DBP absorption of between 40 and 140 ml/100 g and a specific BET surface of between 20 and 250 m²/g and a content of 0.01 to 20 wt. % of silicon, referred to its overall weight,
    wherein in rubber mixtures said carbon black has a tan $\delta_0$/tan $\delta_{60}$ ratio greater than 3.37–0.0068 STSA, and
    wherein said carbon black is produced by a seed-induced carbon black formation.

2. A carbon black according to claim 1, further comprising 0.01 to 1 wt. % of nitrogen, in addition to said silicon.

3. A process for producing a carbon black according to claim 1, comprising:
    formation of carbon black seeds by combustion of carbon black oil, oil, a mixture of oil and natural gas or natural gas alone as fuels, and
    oxidative pyrolysis of carbon-containing carbon black raw material in a carbon black reactor,
    wherein silicon-containing compound is mixed into the carbon-containing carbon black raw material.

4. A process for producing a carbon black according to claim 3 by oxidative pyrolysis of the carbon-containing carbon black raw material, comprising:
    spraying silicon-containing compounds into at least one reaction chamber of the carbon black reactor.

5. A process according to claim 3,
    wherein said silicon-containing compound is at least one organosilicon compound selected from the group consisting of organosilanes, organochloro-silanes, silicic acid esters, siloxanes and silazanes.

6. A process according to claim 3, comprising:
    bringing the carbon black raw material into direct contact with said carbon black seeds.

7. A process according to claim 6, wherein the fuel comprises carbon black oil, and the process further comprises:
    varying silicon distribution in the carbon black by varying mixing of the silicon-containing compound in the carbon black oil.

8. A method of using the carbon black according to claim 1, comprising:
    adding the carbon black as a reinforcing carbon black in rubber mixtures for making tires, wherein said tires have reduced rolling resistance and improved wet skidding behavior.

* * * * *